No. 11,733. Reissued Apr. 11, 1899.
L. L. FILSTRUP.
SAW SHARPENING MACHINE.
(Application filed Feb. 23, 1899.)
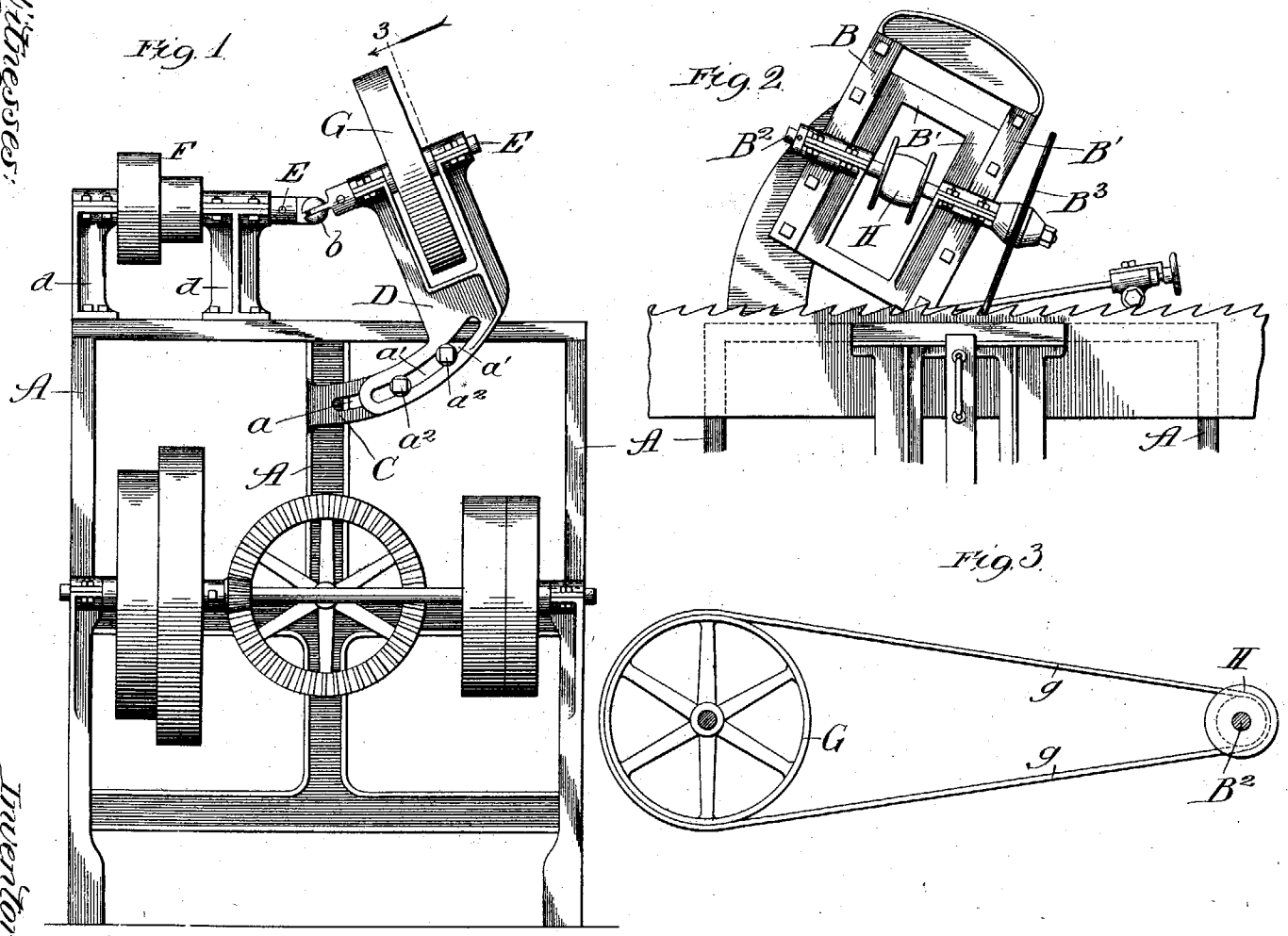
Witnesses:
Chas. E. Gaylord,
Lucie S. Filter
Inventor:
L. Larsen Filstrup,
By Dyrenforth & Dyrenforth
Attys
THE NORRIS PETERS CO., PHOTO-LITHO., WASHINGTON, D. C.

UNITED STATES PATENT OFFICE.

LARS LARSEN FILSTRUP, OF CHICAGO, ILLINOIS, ASSIGNOR OF ONE-HALF TO HENRY P. SCHOFIELD, OF SAME PLACE.

SAW-SHARPENING MACHINE.

SPECIFICATION forming part of Reissued Letters Patent No. 11,733, dated April 11, 1899.

Original No. 615,152, dated November 29, 1898. Application for reissue filed February 23, 1899. Serial No. 706,611.

*To all whom it may concern:*

Be it known that I, LARS LARSEN FILSTRUP, a citizen of the United States, residing at Chicago, in the county of Cook and State of Illinois, have invented a new and useful Improvement in Saw-Sharpening Machines, of which the following is a specification.

This invention relates to improvements in that class of automatic saw-sharpening machines set forth in Patent No. 574,855, dated January 5, 1897.

The object of this invention is to provide a construction by means of which the driving-pulley, having belt connection with the grinding-wheel arbor-pulley, may be readily set at an angle corresponding in degree with the inclined position of the grinding-wheel gate and the guide-standards in which the same moves. Under the present arrangement the driving-shaft of the machine is mounted in a horizontal position and cannot be adjusted to follow the adjustment or change in inclination of the grinding-wheel gate-head. This has the effect of running or straining the driving-belt off to one side, causing it to frequently run off of the pulleys and wearing it out too soon. The improved construction obviates these objections and causes the driving-belt to always run over the center of the pulleys no matter at what angle the grinding-wheel gate may be set.

Figure 1 is a rear elevation of a machine embodying my improved features. Fig. 2 is a broken-away front elevation of the same, and Fig. 3 a detached side elevation of the driving-pulleys and connecting-belt.

A represents the different parts of the main frame; B, the inclined guides; B′, the grinding-wheel gate moving therein; $B^2$, the arbor provided with suitable journal-bearings, and $B^3$ the grinding or sharpening wheel mounted on said arbor. These different parts are capable of being adjusted to any desired angle in accordance with the form of the saw-tooth required and is the ordinary arrangement in this class of machines.

The rear part of the frame is provided with an arm C, having a curved slot *a* therein, as shown in Fig. 1. The lower end of a bearing-bracket D is provided with a corresponding slot *a′*, and is adjustably attached to the arm C by a number of bolts $a^2$, inserted through the companion slots.

The normal position, Fig. 1, of the bearing-bracket D is at an inclined angle and has one end of the driving-shaft E journaled in the upper end thereof.

The driving-shaft E is constructed in two parts, connected together by a universal joint *b*, so that both parts rotate together, but adapting one part to be adjusted at an inclined angle with reference to the other part. The horizontal part of the shaft E is journaled in standards *d d*, rigidly mounted on the frame, the inclined part being journaled in the upper end of the adjustable bracket D. The shaft-driving pulley F is mounted on the horizontal part of the shaft, and the pulley G, transmitting motion to the grinding-wheel arbor, is mounted on the inclined part of said shaft. A pulley H is mounted on the arbor $B^2$ and is connected with pulley G on the driving-shaft by means of a belt *g*, as shown in Fig. 3. By this arrangement one part of the driving-shaft may be adjusted to any angle corresponding to the inclined adjustment of the grinding-wheel gate.

The feature of transmitting motion by means of a two-part shaft, one part being at an angle to the other, is not broadly new, the use of a universal joint for such a purpose being well known. On the other hand, the purpose of the present invention may be accomplished, though the universal joint shown (and commonly so known) be replaced by other suitable connection whereby motion can be transmitted from the horizontal to the inclined portion of the shaft, the inclination of which latter is adjustable. It is not essential that the shaft parts be actually attached together, but only that suitable transmission means be supplied at their adjacent ends.

What I claim as new, and desire to secure by Letters Patent, is—

1. In a saw-sharpening machine of the class described, the combination with the inclined grinding-wheel gate and its arbor, of a two-part driving-shaft, one part of which may be set at various angles to the other, an adjustable support for the inclined portion of the shaft, means for transmitting motion from the horizontal to the inclined portion of the shaft, and means for transmitting motion from the inclined portion of the shaft to the grinding-wheel arbor, substantially as and for the purpose set forth.

2. In a saw-sharpening machine, the combination with an arm, provided with a curved slot and secured to the frame, of a bearing-bracket, having a corresponding slot in its lower end, the bolts, inserted through said companion slots and securing the bearing-bracket to said arm in an adjustable relation, a driving-shaft, constructed in two parts and connected by a universal joint, the inclined part being journaled in the bearing-bracket, and the grinding-wheel gate, substantially as described.

3. In a saw-sharpening machine, the combination with a driving-shaft, constructed in two parts and connected by a universal joint, whereby one part may be set at an inclined angle with reference to the other part, of an adjustable bearing-bracket, supporting the inclined part of said shaft, the grinding-wheel gate and its arbor, and means for transmitting motion from the driving-shaft to said arbor, substantially as described.

4. In a saw-sharpening machine, the combination with a grinding-wheel gate, set at and moving in an inclined plane, the arbor, carrying the sharpening-wheel, a driving-shaft, constructed in two parts and connected by a universal joint, and a bearing-bracket supporting one part of said shaft and adapted to be adjusted to an angle corresponding to that of the grinding-wheel gate, and means for transmitting motion from the driving-shaft to said arbor, substantially as described.

LARS LARSEN FILSTRUP.

In presence of—
R. T. SPENCER,
D. W. LEE.